United States Patent [19]
Kotaki et al.

[11] Patent Number: 5,408,593
[45] Date of Patent: Apr. 18, 1995

[54] APPARATUS AND METHOD FOR CREATING VIDEO IMAGES INCLUDING SOFT-EDGE PROCESSING

[75] Inventors: Kenji Kotaki, Kishiwada; Hiroshi Nagashima, Wakayama, both of Japan

[73] Assignee: Shima Seiki Mfg., Ltd., Wakayama, Japan

[21] Appl. No.: 137,216

[22] Filed: Oct. 18, 1993

Related U.S. Application Data

[63] Continuation of Ser. No. 638,436, Jan. 7, 1991, abandoned.

[51] Int. Cl.⁶ ............................................. G06F 15/72
[52] U.S. Cl. .................................................. 395/122
[58] Field of Search ............... 395/117, 118, 122, 143, 395/146–148

[56] References Cited

U.S. PATENT DOCUMENTS

| | | | |
|---|---|---|---|
| 4,772,763 | 9/1988 | Garwin et al. | 178/18 |
| 4,796,020 | 1/1989 | Zigmantas et al. | 340/728 |
| 5,038,223 | 8/1991 | Yamada | 358/445 |
| 5,134,688 | 7/1992 | Corthout | 395/142 |
| 5,175,625 | 12/1992 | Miles | 358/183 |

FOREIGN PATENT DOCUMENTS

| | | |
|---|---|---|
| 0367405A3 | 5/1990 | European Pat. Off. . |
| 0403054A2 | 12/1990 | European Pat. Off. . |
| 62-35980 | 2/1987 | Japan . |
| 2089625 | 7/1982 | United Kingdom . |
| 0403054 | 4/1990 | United Kingdom . |

*Primary Examiner*—Mark R. Powell
*Assistant Examiner*—Huynh Ba
*Attorney, Agent, or Firm*—Wenderoth, Lind & Ponack

[57] ABSTRACT

Soft-edge processing of a video color image is effected in accordance with a stylus nib pressure. Initially, a display circle unit is determined having center coordinance corresponding to display coordinance of a stylus and having a radius corresponding to a nib pressure of the nib stylus. A display region is set encompassing the display circle unit, the display region having a plurality of pixels. A distance from each pixel located outside the circle unit within the display region to the circle unit is determined. This distance is then used as the basis for determining a Z value of the pixel which is indicative of the relative illumination of the pixel to effect soft-edge processing of the image.

21 Claims, 12 Drawing Sheets

⊘ COORDINATE POSITIONS CORRESPONDING TO PIXEL

○ COORDINATE POSITIONS AT RESOLUTION OF 0.25

APPARATUS AND METHOD FOR CREATING VIDEO IMAGES INCLUDING SOFT-EDGE PROCESSING

This application is a Continuation of now abandoned application Ser. No. 07/638,436, filed Jan. 7, 1991.

BACKGROUND OF THE INVENTION

1. Field of the Invention

The present invention relates to improvements in an apparatus and method for editing and creating video images, and more particularly, to an apparatus and method for editing and creating video images which is capable of effecting a high quality and high speed real-time adjustment of a nib diameter in accordance with an applied pressure of a stylus pen and effecting soft edge processing corresponding to the nib diameter.

2. Description of the Prior Art

A general conventional apparatus for editing and creating video images includes, among other things, an input device composed of a stylus pen, tablet, keyboard and other such input components, an operation processor for processing various data signals from the input device, and a display device. An image drawn on the table by an operator using the stylus pen is displayed in real time on the display device.

In such an apparatus for editing and creating video images, however, the operator must usually select a pen of proper diameter from among specified stylus pens, and draw on the tablet using the selected pen. In actuality, only a few stylus pens are available, and it is difficult to contact the pen on the tablet in a sufficiently delicate manner to obtain precise corrected works having accurate and smooth features.

In the outer periphery of a painted image drawn using an actual paint brush, a spontaneous soft boundary (hereinafter called a soft edge) is usually formed by a delicate mixing of the brush color and the paper color. In the apparatus for editing and creating video images using a stylus pen, it is indispensable to subject the video signal to so-called soft edge processing in order to realize a soft edge in the video image.

A soft edge processing method has been developed for this kind of apparatus for editing and creating video images, in which the touch of the soft edge processing itself is varied by the stylus pen pressure and fed back (e.g., Japanese Laid-open Patent No. 62-35980).

Such a soft edge processing method can simulate existing painting tools (brushes, pens, etc.) to a certain extent, and realize various pen touches of painting tools in a nearly satisfactory manner.

Generally, when painting a drawing or correcting a drawing, however, in order to more precisely realize delicate pen touches of painting tools such as brushes, it is more important to vary the diameter of the nib depending on the pressure applied by the stylus pen, rather than to vary the degree of soft edge processing itself by the stylus pen pressure and to feed it back.

In the actual world of painting, even when the same brush and same color are used, the touch (pressure) of the brush varies significantly depending on the medium that is painted (for example, the pressure applied when painting on paper and that when painting on cloth differs by about two to one). Therefore, in order to simulate the brush perfectly, it is necessary to effect processing in harmony with a change of nib diameter depending on the nib pressure and the material to be painted on, aside from the change of the degree of soft edge processing. In the conventional soft edge processing method of varying only the degree of the soft edge processing according the stylus pressure and feeding it back, the painting tools cannot be simulated completely, and delicate touches of the painting tools cannot be reliably reproduced.

Further, in the conventional soft edge processing method, it is extremely difficult to process the soft edge following a fast moving speed of the stylus pen, and hence it is necessary to restrict the pen moving speed within a certain speed or to use an expensive electronic device.

SUMMARY OF THE INVENTION

The present invention is intended to solve the convention problems of (1) the difficulty of obtaining a desired pen touch and making fine corrections smoothly since the number of selectable and usable stylus pens is limited, (2) the difficulty of realizing perfect simulation of painting tools and a perfect touch of a brush, and (3) the difficulty of increasing soft edge processing and realizing a soft edge as the moving speed of the stylus pen increases. An object is hence to present an apparatus for editing and creating video images and a method for editing and creating video images capable of high quality painting in real time on a display device without extensive use of expensive devices.

The present inventor closely observed the painting works and paint correction works of artists, and found that the artists paint and correct fine parts and bold parts skillfully by using various directions and intensities (pressures) of the brushes depending on actual painting materials. In particular, painting and correction are often done while varying the intensity of the brush (brush pressure). Therefore in editing and creating electronic images, it is found that the diameter of the brush (the thickness of the line of the painted image) should be determined in the first place depending on the stylus pressure, rather than directly determining the degree of soft edge processing (density) of the painting from the stylus pressure. That is, whether the natural painted image can be realized in an electronic apparatus or not is found to depend on how the diameter of the stylus varies depending on the stylus pressure, following the moving speed of the stylus pen, while maintaining the soft edge of the stylus nib.

The invention is developed on the basis of the results of observation and analysis, and is fundamentally designed to feed back the pen nib pressure from the stylus pen to an operation processor, varying the nib diameter smoothly, following up the speed of the stylus pen operated by the operator, and processing the painted data signal by painting size variable type anti-aliasing.

More particularly, the apparatus of the invention disclosed herein is an apparatus for editing and creating video images including an input device such as digitizer, an operation processor composed of a painting data memory and frame memory, and a display device. The operation processor includes a main processor for controlling the operation of the apparatus; a painting front-end processor for calculating interpolation values by processing pen coordinate values and pen nib pressure values from the input device when executing a command relating to pen painting, and delivering calculated values composed of center coordinate values of a circle painting unit and a radius "b" of the circle unit; a painting address operation processor for supplying addresses to the frame memory corresponding to the coordinate values of the input device; a Z-operation processor for calculating the distance "a" extending from the pixel address integer value Pn calculated by the painting address operation processor to the center value of the circle painting unit and the difference "c" between this distance "a" and the painting radius "b", and delivering the calculated values Z corresponding to the painting radius i.e. the nib diameter, by referring to a table with the calculated value "c"; and an anti-aliasing processor for receiving the calculated value Z from the Z-operation processor, mixing the original painting data from the frame memory and the painting data from the painting data memory on the basis of the calculated value Z, and feeding the same to the frame memory.

The invention disclosed herein is also a method for soft edge processing of the painting drawn on the digitizer and displaying on a display device by means of an apparatus for editing and creating video images including an input device, operation processor and display device, in which the pen coordinate values and pen stylus pressure values entered from the digitizer are arithmetically processed to calculate the individual interpolation values, the calculated value "c" proportional to the pen nib pressure is calculated from the interpolation values, the calculated value Z corresponding to the painting radius is calculated from this calculated value "c" by referring to a table, and the anti-aliasing processing proportional to the calculated value Z is executed on the painting data from the frame memory and painting data memory, thereby making it possible to a paint picture of high quality in real time.

The coordinate data and nib pressure data of the stylus pen entered from the input device into the operation processor are individually exchanged with the interpolation values in the painting front-end processor. The calculated interpolation values are fed into the Z-operation processor, and the calculated value "c" corresponding to the nib pressure is calculated, and by using this calculated value "c", the value of Z is calculated corresponding to the painting radius by referring to the table.

The calculated value Z is fed into the anti-aliasing processor, and according to this calculated value Z (that is, the value corresponding to the nib diameter proportional to the pen nib pressure), the original painting data from the frame memory and the painting data from the painting data memory are subjected to anti-aliasing processing and stored in the frame memory.

The painting display data after anti-aliasing processing is fed from the frame memory into the display device, and a high quality picture after anti-aliasing processing depending on the nib diameter corresponding to the pen nib pressure is realized in real time.

Each processing in this operation processor is executed on the whole area specified by the painting points, and is overlapped on every painting point.

In the invention, from the pen nib pressure value and pen coordinate values entered from the digitizer, the interpolation values are determined by the painting front-end processor, and every painting point designated by the interpolation values is processed and overlapped sequentially. As a result, if the processing capacity of the digitizer is slow, the coordinate data and pen nib pressure data are not discontinuous, and the movement of the stylus pen can be simulated smoothly and securely.

Further, in the invention, in the Z-operation processor, the calculated value "c" corresponding to the nib diameter which is proportional to the pen nib pressure is determined, and the Z-value is calculated by referring to a table on the basis of the calculated value "c", and the same is delivered to the anti-aliasing processor. As a result, the Z-value can be determined by preparing a Z-value table possessing a proper "c" value range, and anti-aliasing processing following the movement of the stylus pen is possible.

Furthermore, by properly varying the content of the Z-value table, the degree of the anti-aliasing processing may be changed easily, and by properly selecting the width of the value of "c", the range of anti-aliasing processing may be varied.

In addition, in the invention, since the nib diameter is changed depending on the pen nib pressure and the anti-aliasing processing is carried out properly on the basis thereof, as compared with the case of direct soft edge processing from the pen nib pressure as in the prior art, a more delicate brush touch may be realized, and a painting picture of higher quality may be obtained.

Thus, according to the invention, without using expensive devices, painting images of extremely high quality may be realized in real time, and superb practical effects are brought about.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Now referring to FIGS. 1 to 6, preferred embodiments of the invention are described below.

Figure 1:
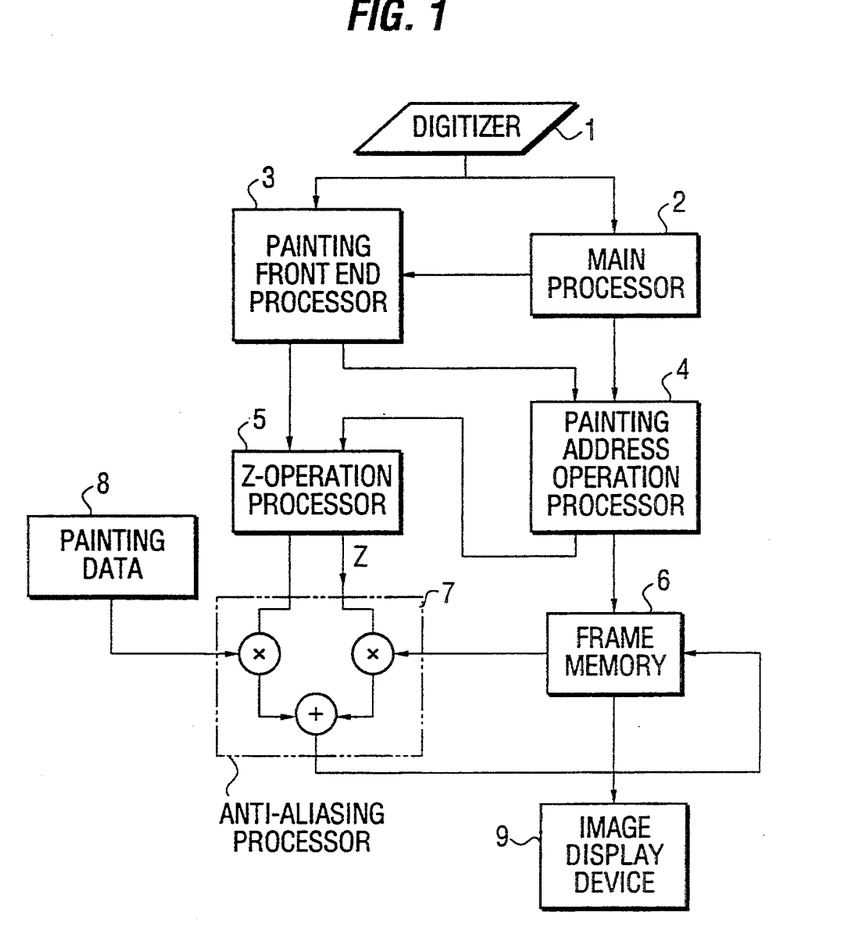
FIG. 1 is a block diagram showing the basic composition of an apparatus for editing and creating video images according to the invention.

FIG. 1 is a block diagram showing the composition of an apparatus for editing and creating video images according to the invention. The apparatus includes an input device (digitizer) 1 composed of a stylus pen, a keyboard and a touch tablet, a main processor 2, a painting front-end processor 3, a painting address operation processor 4, a Z-operation processor 5, a frame memory 6, an anti-aliasing processor 7, a painting data memory 8, and an image display device 9.

Pen coordinate values based on a coordinate system of the digitizer 1 and pen nib pressure values of the stylus pen operated by an operator are repeatedly output at specific time intervals from the digitizer 1. The thus output data are fed to the main processor 2 and the painting front-end processor 3. The pen nib pressure value denotes the manual pressure applied to the stylus pen by the operator.

The main processor 3 processes the pen coordinate values from the digitizer 1, interprets commands from the content of a menu, and sets data corresponding to the commands to the processors 3, 4. When executing a command relating to pen painting, in order to achieve a rapid operation, the pen coordinate values are processed in the painting front-end processor 3. In the main processor 2, cursor display, keyboard sensing, and other processings are carried out.

The painting front-end processor 3 is responsible for processing the pen coordinate values X, Y and pen nib pressure W when executing commands relating to pen painting as mentioned above. For example, with coordinates X, Y as a center, a circle painting unit is determined having a radius "b" which is proportional to the nib pressure W.

In a case where movement of the stylus pen by the operator is too fast, it is difficult to sufficiently trace the pen trajectory from the coordinate outputs of the digitizer 1 due to the limited processing speed of the digitizer 1. The output coordinate data are discrete rather than continuous, thus creating discontinuities in the trace.

To avoid such discontinuities, the processor 3 effects so-called interpolation processing of the input data.

Figure 2:
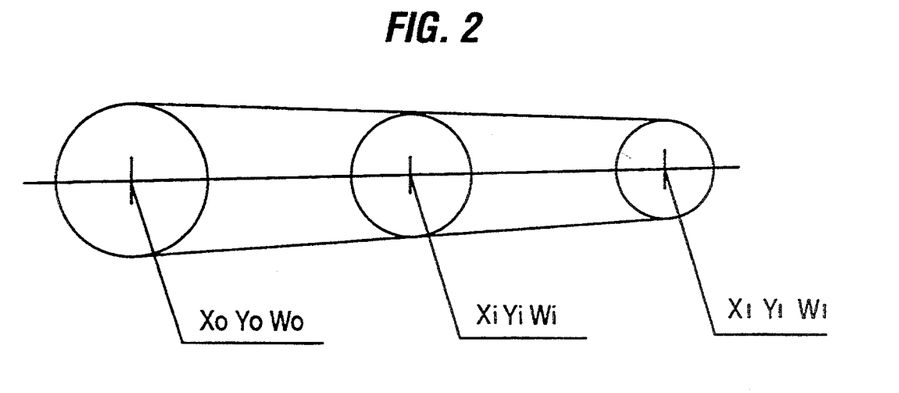
FIG. 2 is a schematic explanatory diagram of interpolation processing in a painting front-end processor.

FIG. 2 shows an example of the interpolation processing, in which the interpolated values (Xi, Yi, Wi) are calculated from the input pen coordinate data (Xo, Yo), (X1, Y1), and the input pen nib pressure data (Wo), (W1) generated by the digitizer 1. As a result of such interpolation processing, the discontinuities of the coordinate data from the digitizer 1 are removed, thus enabling the simulation of a smooth stylus pen movement. Such simulation is preferably executed by interpolation at a 1/5 pitch of the radius of the circle painting unit.

The calculated interpolation values (Xi, Yi, Wi) expressing the center coordinates and radius of each circle painting unit extending along a trace, are output to the painting address operation processor 4 and the Z-operation processor 5.

The painting address processor 4 supplies a so-called DMA address to the frame memory 6 corresponding to the coordinate data of the digitizer 1. This DMA address is generated according to coordinates defining a square region which encompasses a circle painting unit and which is centered on the center coordinates of the circle painting unit.

The processor 4 calculates an address integer data Pn corresponding to a pixel address on the image display device 9, and feeds the data Pn to the Z-operation processor 5. The address integer data Pn is generated according to a scanning of the square region.

Figure 3:
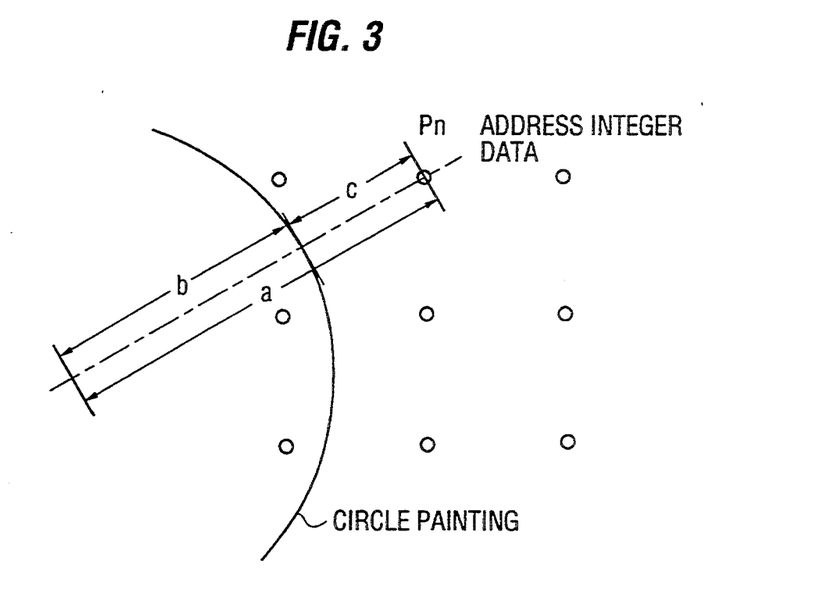
FIG. 3 is an explanatory diagram of the content of arithmetic processing of a Z-operation processor.

The Z-operation processor 5 calculates, as shown in FIG. 3, the center coordinate values of the circle painting unit relative to corresponding digitizer coordinates, from the address integer data Pn value received from the painting address operation processor 4, and calculates the distance "a" from the point of the Pn value to the circle center specified by the digitizer coordinates, and also calculates the difference "c=a−b" between the distance "a" and the painting radius "b". In addition, the Z-operation processor 5 applies the calculated "c" value to the graphical relation shown in FIG. 5(a) to determine the Z-value corresponding to the painting radius, and delivers the calculated value Z to the anti-aliasing processor 7.

The operation unit of the Z-operation processor 5 has a so-called pipe-line structure and performs real time processings.

Figure 5A:
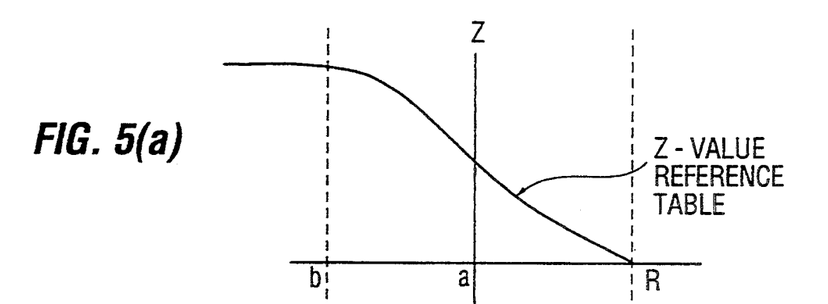
FIG. 5(a) shows an example of a Z-value reference graph in the Z-operation processor.

Three to five types of reference graphs is shown in FIG. 5(a) are prepared, each having a necessary width for the range of the "c" value (for example, $0 \leq c \leq 200$, corresponding to types of a stylus, such as brush, pencil, and airbrush). The type of reference graph is selected by the operator at the command level operation, so that the degree of soft edge processing may be varied.

In the invention, as mentioned above, the Z-operation processor 5 calculates the "c" value as shown in FIG. 3 corresponding to the nib pressure, and a Z-value corresponding to the "c" value is then obtained by referring to a prepared graph. Therefore, it is sufficient to prepare a set of Z-value graphs corresponding to "c" value ranges for each type of stylus (for example, approximately $0 \leq c \leq 200$). By providing a set of reference graphs, soft edge processing of the brush and pen diameter, tracing the movement of the stylus pen, can be realized without using expensive parts.

To the contrary, if it is attempted to realize the same function as the Z-operation processor 5 of the invention using a reference graph only (i.e. without calculating the "c" value), after preliminarily writing the Z-values as image data in a memory by preparing all possible data of the radius "b" and the center coordinates at each circle painting unit, the pattern image data of the Z-values become enormous as mentioned below, thus making realization practically impossible.

Figure 4:
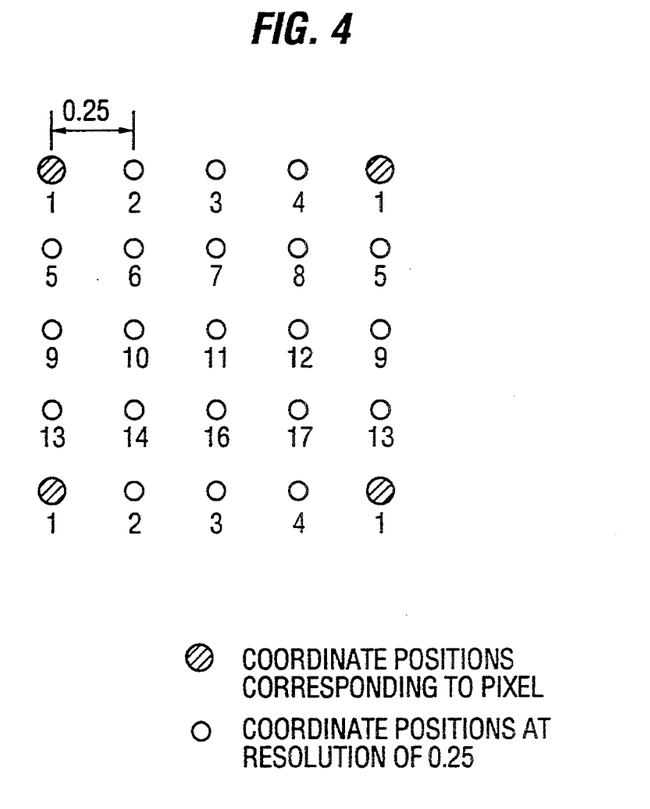
FIG. 4 is an explanatory diagram showing coordinate points in a real number operation.

That is, suppose all ranges of the radius from 1 to 512 are prepared as patterns and a resolution of 0.25 is set according to the required precision. Z-value patterns corresponding to 512/0.25=2047 types of radii (exclusive of zero radius) are required. Concerning the center coordinates, the resolution of 0.25 is also required for X and Y respectively, and the pattern image data of Z-values must be prepared independently for the designation below the decimal point. Therefore, supposing the resolution in the X, Y coordinates to be 0.25, the number of center coordinates that can be taken is 16 positions as shown in FIG. 4, and in each one of these center coordinates, pattern image data in 2047 different radii are required.

As a result, the total number of pattern image data that are required is 2047×16=32752 patterns, and when five types of distribution patterns of the Z-values are prepared, the necessary Z-value pattern image data is 32752×5=163760 types.

As a result, the preparation reference data for each possible circle painting unit requires an enormous amount of Z-value pattern image data, thus making realization impractical.

Returning now to FIG. 1, the frame memory 6 is a RAM of multiport access structure. The memory 6 delivers the image display data to the image display device 9, and simultaneously performs a read-modify-write operation.

The anti-aliasing processor 7 is composed of two multipliers and an adder. The original image data A from the frame memory 6 is multiplied by the Za-value from the Z-operation processor 5, and the painting data B which corresponds to the color of the image and which is output from the painting data memory 8 is multiplied by the Za-value. The resultant data are summed to obtain image display data D reflecting proper soft edge processing by the Z-value corresponding to the nib diameter. The image display data D is fed to the frame memory 6.

A $\overline{Za}$-value is the 1's complement of the Za-value, i.e. equals to the $1-Za$ as described below. The original image pixel A corresponding to the pixel address from the painting address operation processor 4 is read out from the frame memory 6, and at the same time the Z-value, such as Za and $\overline{Za}$, corresponding to the address is calculated in the Z-operation processor 5. The thus calculated Z-value is fed to the anti-aliasing processor 7. The result of the processing in the processor 7 is delivered into the frame memory 6 as the image data D, and is written in the same pixel address as the original image data A.

FIG. 5(a) graphically shows a distribution of the Z-value corresponding to a distance from the center of the circle painting unit. In case a<b, Z equals a constant value. In case a>R, Z equals zero.

Figure 5B:
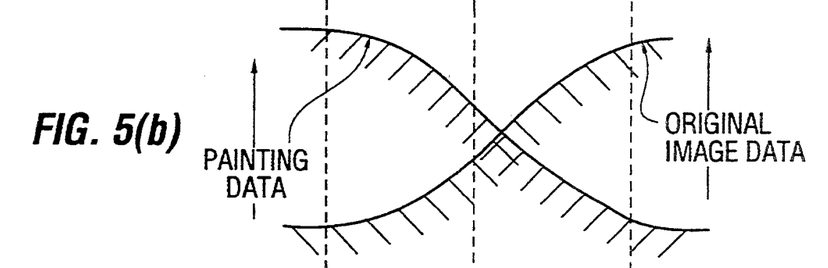
FIG. 5(b) and FIG. 5(c) are explanatory diagrams of data distribution in anti-aliasing processing and an anti-aliasing processing range.
Figure 5C:
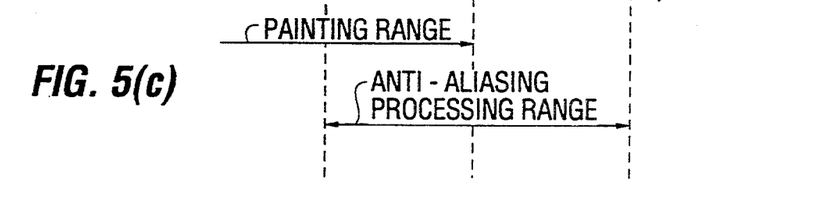

FIG. 5(b) shows a state of soft edge processing in the anti-aliasing processor 7. The original image data A and the painting data B are subjected to soft edge processing to be transformed into the data corresponding to the Z-value reference data. As shown in FIG. 5(c), the anti-aliasing processing is down in a range corresponding to the "c" value of the Z-value reference data, with respect to the boundary of the painting range E.

This operation is effected in the entire area specified by the painting points (that is, the whole area in the circle painting unit), and the result is overlaid at each painting point interpolated by the painting front-end processor 3, and delivered from the frame memory 6 to the image display device 9.

Figure 6:
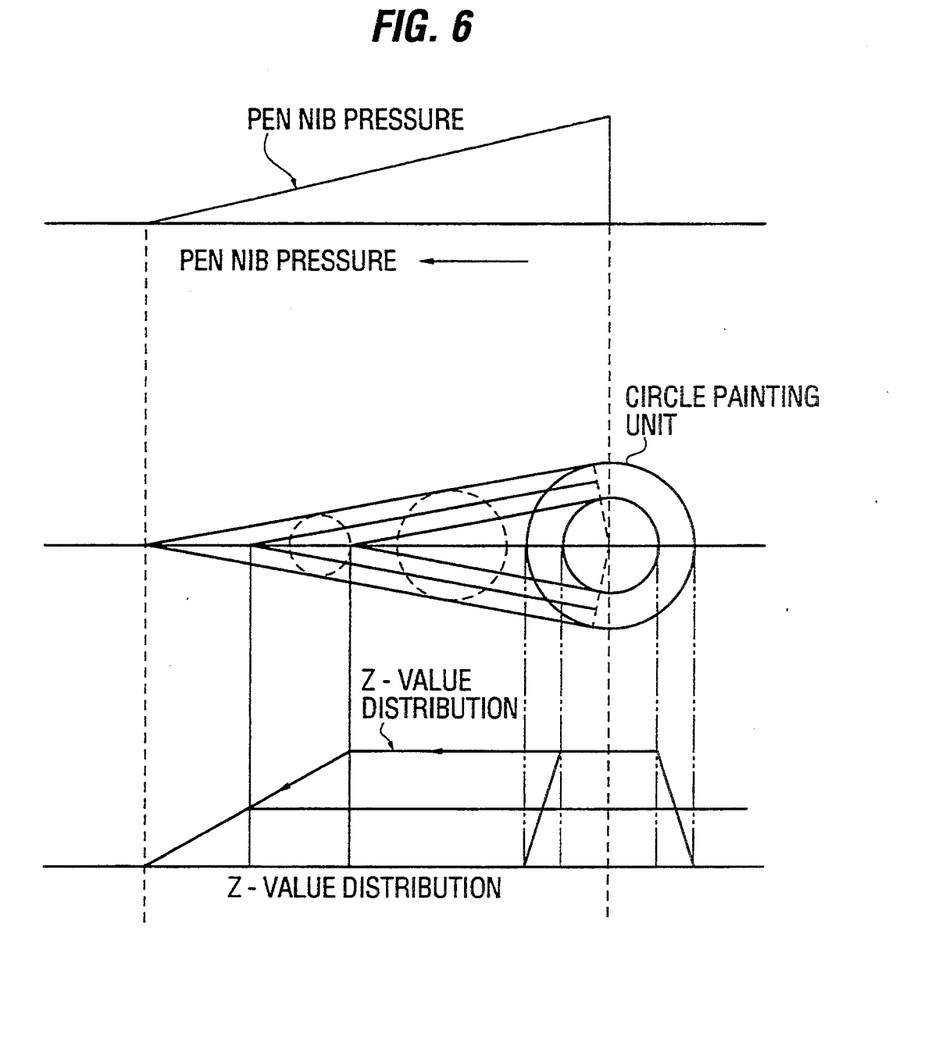
FIG. 6 is a diagram showing the distribution of Z-values in continuous painting processing.

FIG. 6 shows the relation between pen nib pressure, circle painting units and the distribution of Z-values in a continuous painting process. The painting data B and original image data A are subjected to soft edge processing along a smooth Z-value distribution. Smooth painting expressions from thin lines into thick lines, which is characteristic of painting by a brush, are electronically realized.

Figure 7:
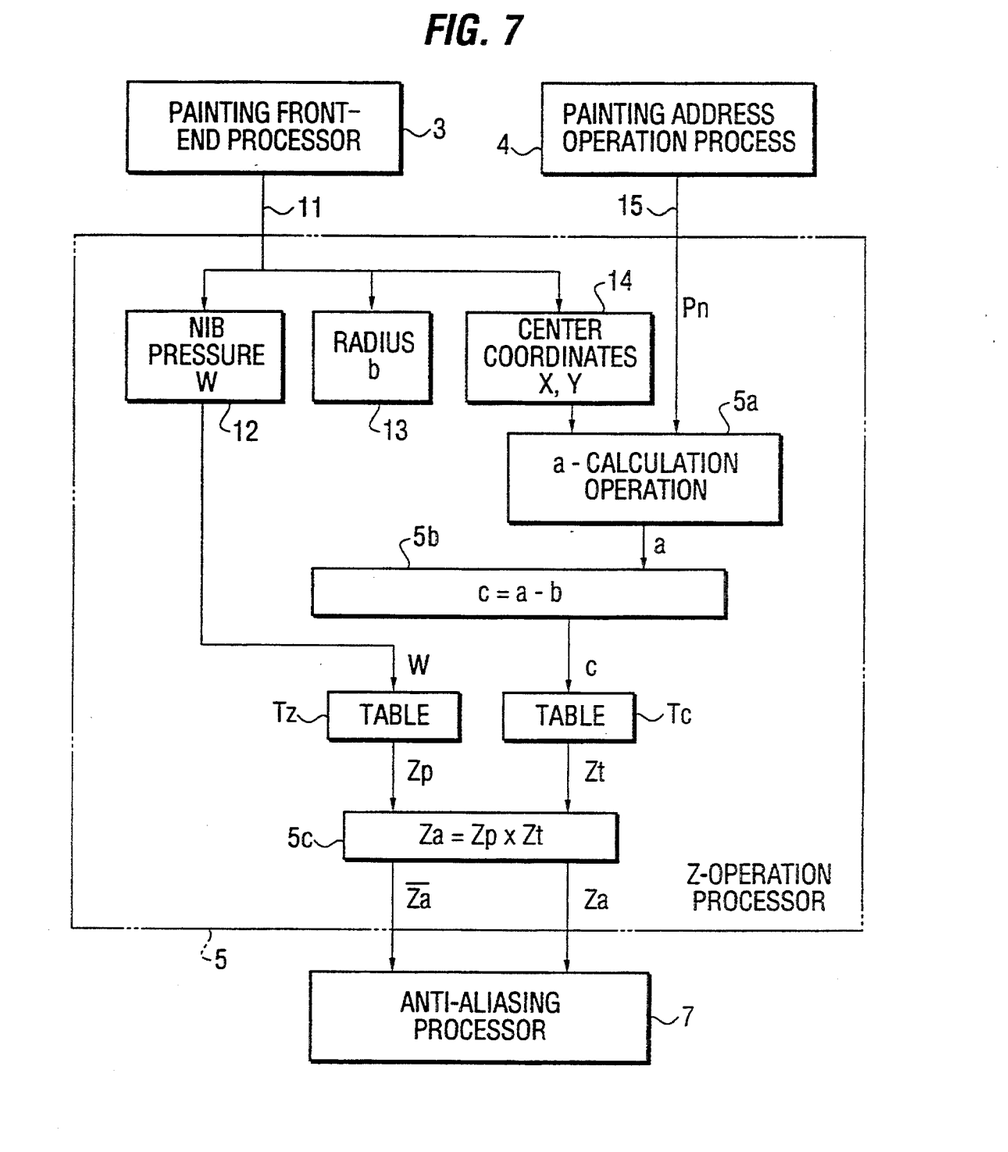
FIG. 7 is a block diagram showing an internal composition of the Z-operation processor.

FIG. 7 is a block diagram showing a structural example of the Z-operation processor 5 which calculates the Z-value. The signals expressing the nib pressure W, radius "b", and center coordinates X, Y received from the painting front-end processor 3 via signal line 11 are latched respectively in nib pressure register 12, radius register 13 and center coordinates register 14. A signal representing the address integer data Pn is received via signal line 15 from the painting address operation processor 4 and applied to an a-calculation operation circuit 5a. The a-calculation operation circuit 5a also receives the center coordinate values X, Y from the center coordinates register 14. The a-calculation operation circuit 5a determines the distance "a" from the center coordinates X, Y to the coordinates corresponding to the pixel address Pn.

The outputs from the a-calculation operation circuit 5a and the radius register 13 are applied to a subtraction circuit 5b, and the difference "c=a−b" is calculated. The table Tc (having data corresponding to the graph of FIG. 5(a)) is referred to, and the contribution degree value Zt corresponding to the value of "c" is obtained for each type of brush. The output from the nib pressure register 12 is applied to the table Tz, and the contribution degree value Zp corresponding to the nib pressure W is obtained.

The outputs from the tables Tc, Tz are applied to a multiplication circuit 5c. The multiplication circuit 5c obtains the value Za=Zp×Zt. The values of Zp and Zt are in a range of $$0 \leq Zp \leq 1$$

$$0 \leq Zt \leq 1$$

and the value Za is also in a range of $$0 \leq Za \leq 1.$$

The multiplication circuit 5c outputs signals to the anti-aliasing processor 7 expressing this value of Za and the value $\overline{Za}$ of the complement of Za where $$\overline{Za} = 1 - Za.$$

In the anti-aliasing processor 7, the intensity of each pixel is calculated as $$D = \overline{Za} \times B + Za \times A$$

where A is the original brightness, B is the painting data, and D is a new brightness.

Figure 8:
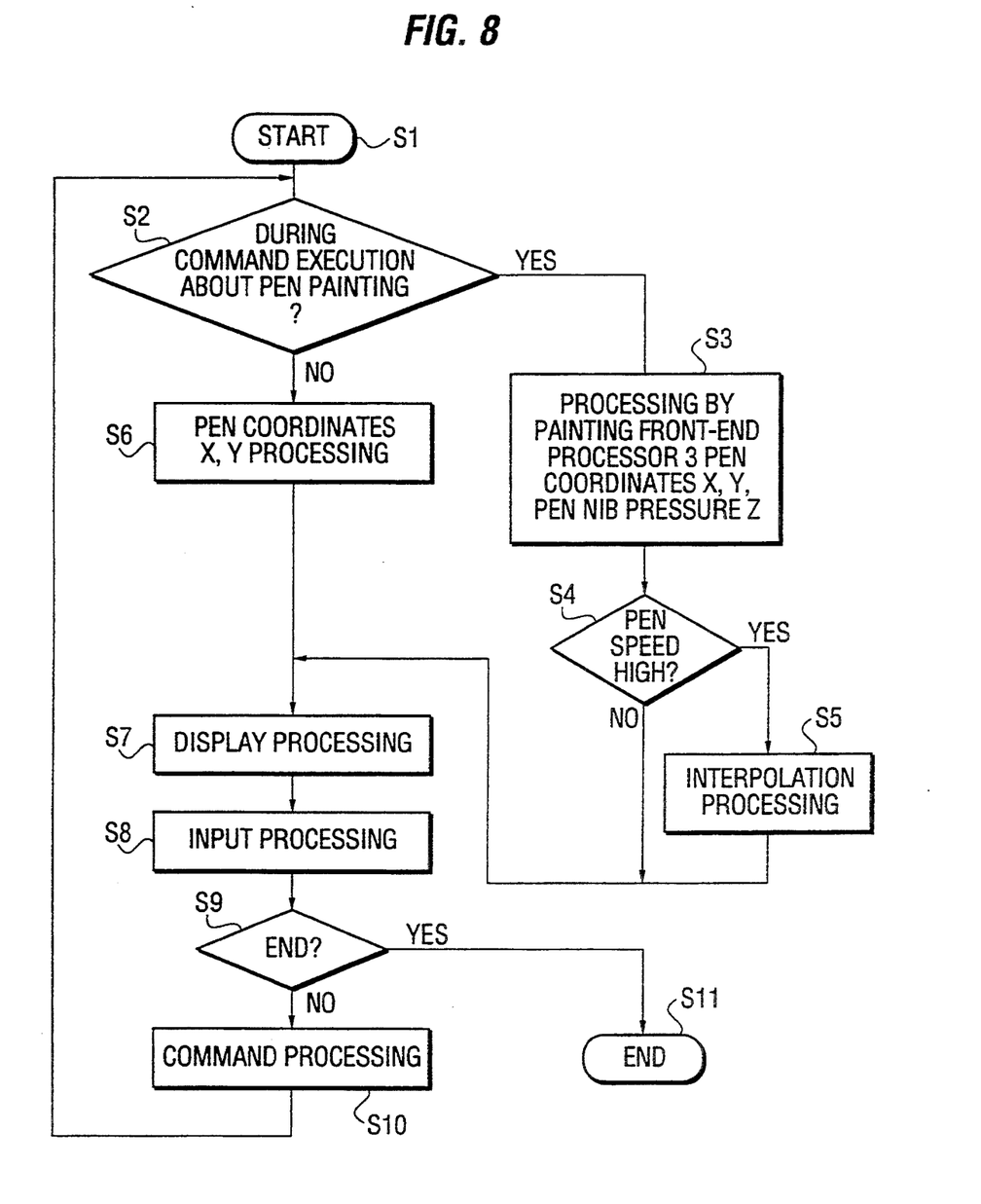
FIG. 8 is a flow chart for explaining the operation of a main processor.

FIG. 8 is a flow chart showing the operation of the main processor 2. The process starts at step s1. When it is judged that a command execution is for pen painting at step s2, the operation advances to step s3 in which processing by the painting front-end processor 3 is carried out. When the pen speed is fast at step s4, the interpolation processing is carried out at steps s4 and s5. At step s6, the pen coordinates input processing, such as menu input, is effected. At steps s7 and s8, display and input processings of the cursor and keyboard are conducted. The given command is processed at steps s9 and s10, and when the end is designated, the operation is terminated at step s11.

Figure 9A:
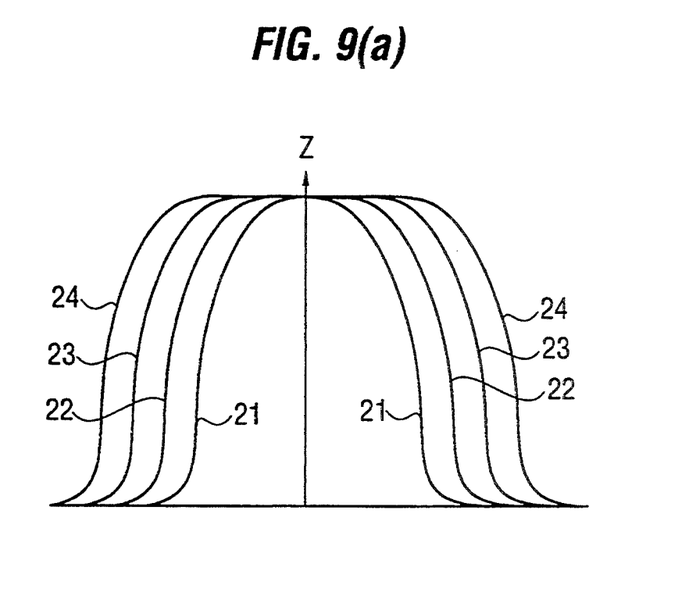
FIGS. 9(a) and (b) are graphs showing the state of change of contribution rate Z depending on nib pressure.
Figure 9B:
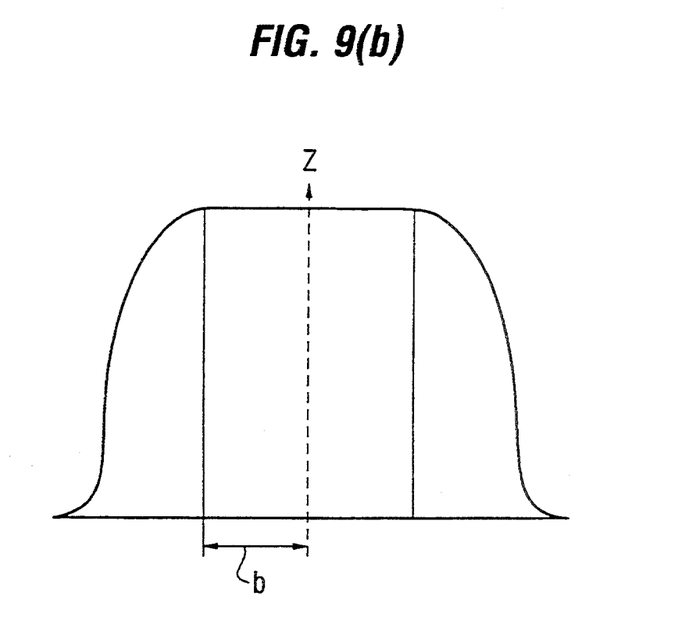

FIG. 9(a) is a graph showing changes of the contribution degree value Z. When the nib pressure W is small, the Z-value is expressed by line 21, and as the nib pressure W increases, the Z-value changes as shown in line 22, line 23 and line 24. It is noted that, as shown in FIG. 9(b), the peak value of the contribution degree value Z is constant even though the radius "b" of the painting circle unit changes corresponding to the changes of the nib pressure W.

Figure 10A:
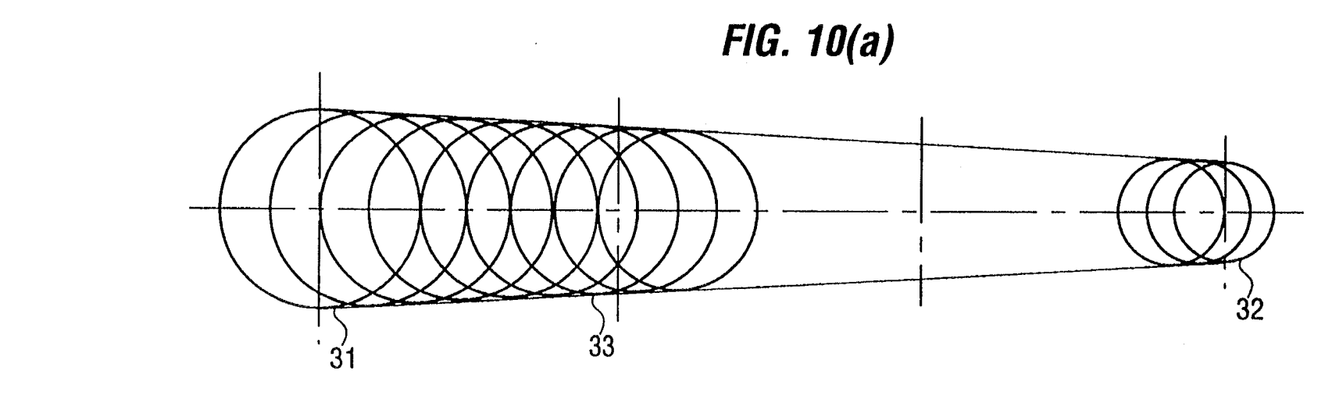
FIGS. 10(a) and (b) are diagrams showing a state of interpolation.
Figure 10B:
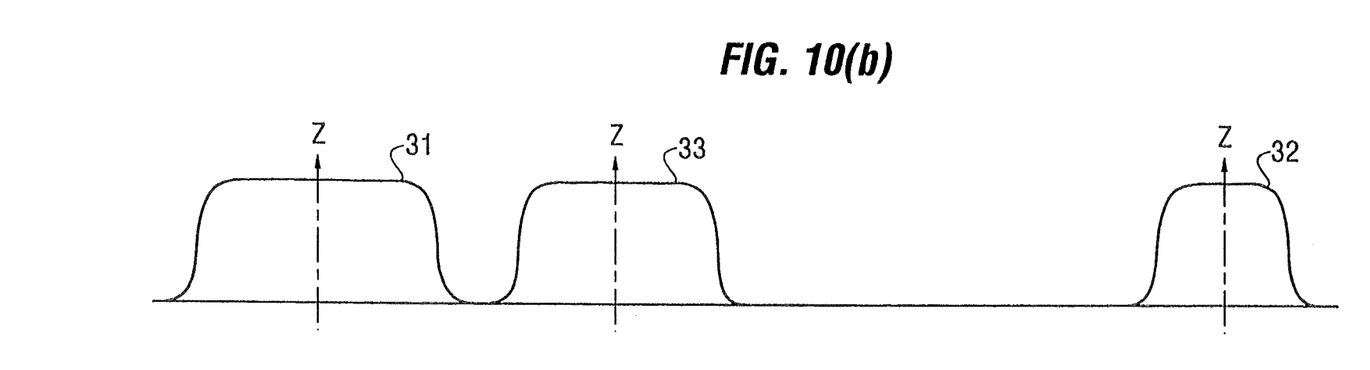

FIG. 10(a) is a graph showing the state of interpolation processing to obtain smooth painting along the movement of the pen 1. The painting front-end processor 3 interpolates between the first circle painting unit 31 and second circle painting unit 32, and sets the intermediate circle painting unit 33. FIG. 10(b) shows the contribution degree value Z corresponding to the circle painting units 31, 32, 33.

Figure 11:
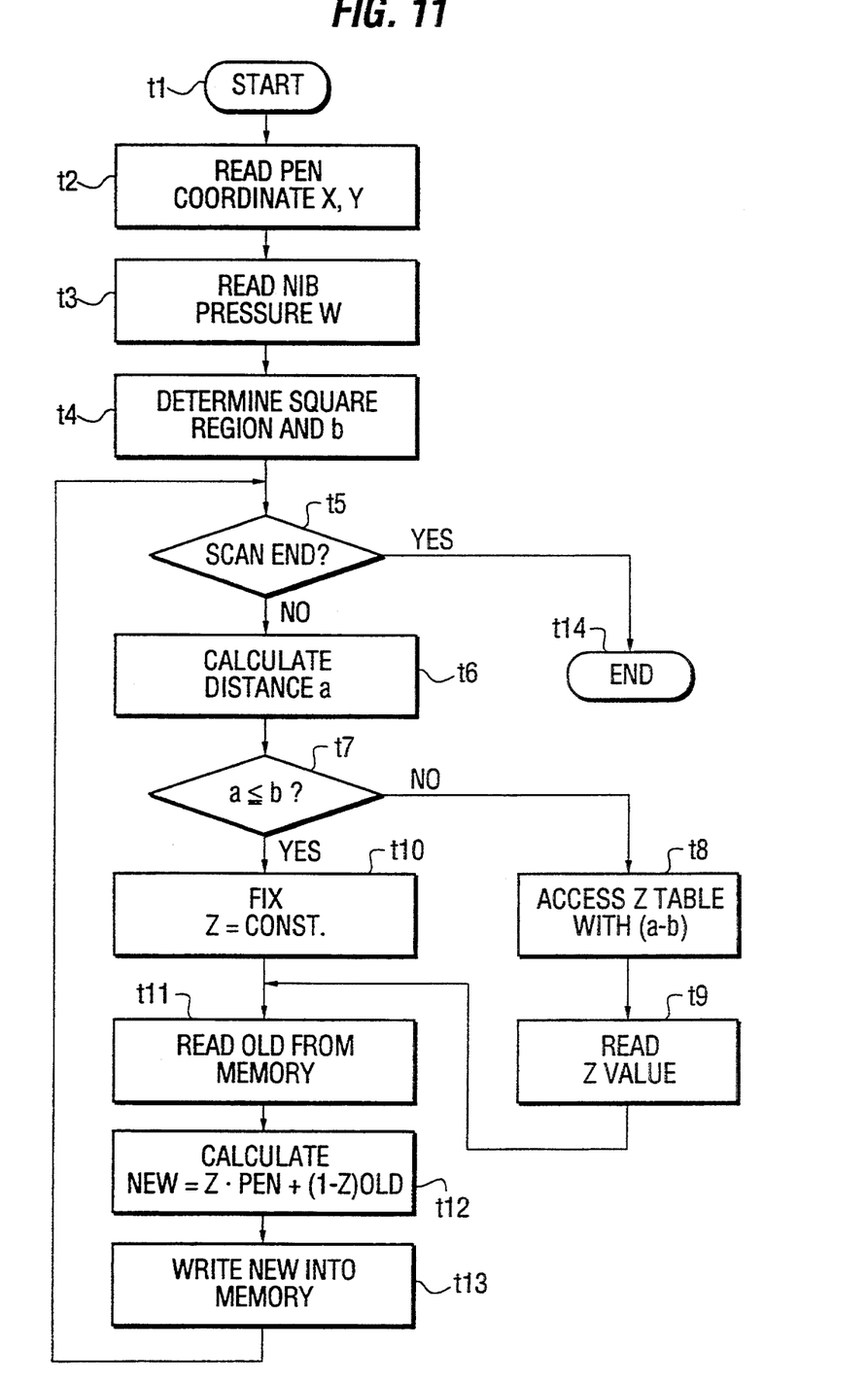
FIG. 11 is a flow chart for explaining the painting operation according to the invention.

FIG. 11 is a flow chart showing the above-mentioned painting operation. Starting at step t1, the coordinates X, Y designated by the stylus pen 1 and the nib pressure are read respectively at step t2 and t3. A square region, which includes the circle painting unit corresponding to the coordinate X, Y, the radius "b" and the nib pressure, is determined at step t4.

At step t5, a scanning operation starts within the square region. A distance "a" from the center X, Y to a scanned pixel address Pn is calculated at step t6. This value "a" is compared with the value "b" at step t7.

In a case where "a" is greater than "b", the Z-value is obtained from a Z table addressed using the "c" value (a−b) at step t8 and t9. In a case where "a" is less or equal to "b", the Z-value is fixed to a predetermined constant value at step t10.

At step t11, previous data corresponding to the previous pixel intensity is read from the frame memory 6 addressed by the data Pn. In previous data and the Pen data representing characters and colors imparted to the pen 1 are combined to calculate a new data at step t12. The new data is written into the frame memory 6 at the pixel address Pn at step t13.

Until the scanning within the square areas is terminated at step t5, steps t5 to t13 are repeated. This scanning process is terminated at step t14.

Figure 12:
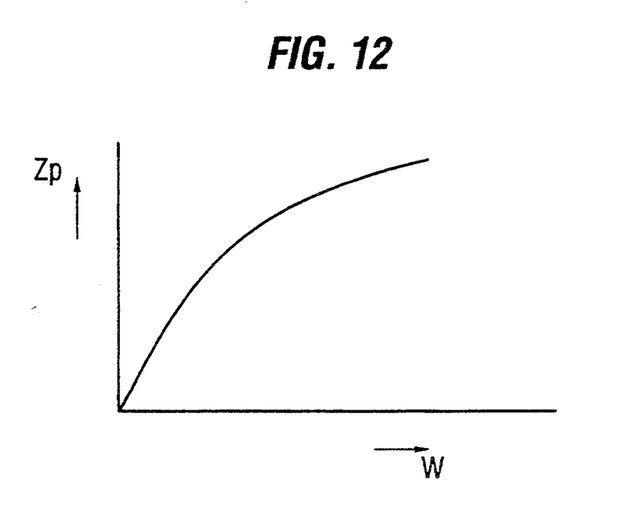
FIG. 12 is a graph showing the stored contents of a Table Tz.

FIG. 12 is a graph showing that the value Zp varies according to a nib pressure W.

Figure 13:
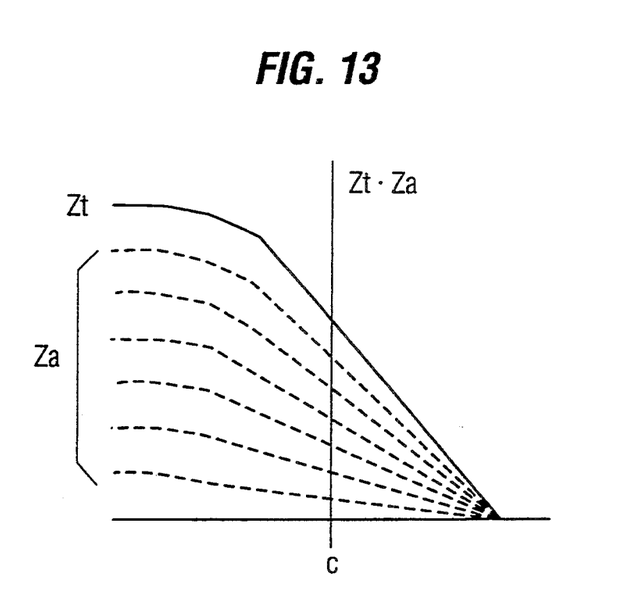
FIG. 13 is a graph showing a distribution of Zt and Za.

FIG. 13 is a graph showing that the values Zt and Za vary according to the distance "c".

FIGS. 14(a) through 14(f) show a relationship between the nib pressure W and the Z value table.

Figure 14:
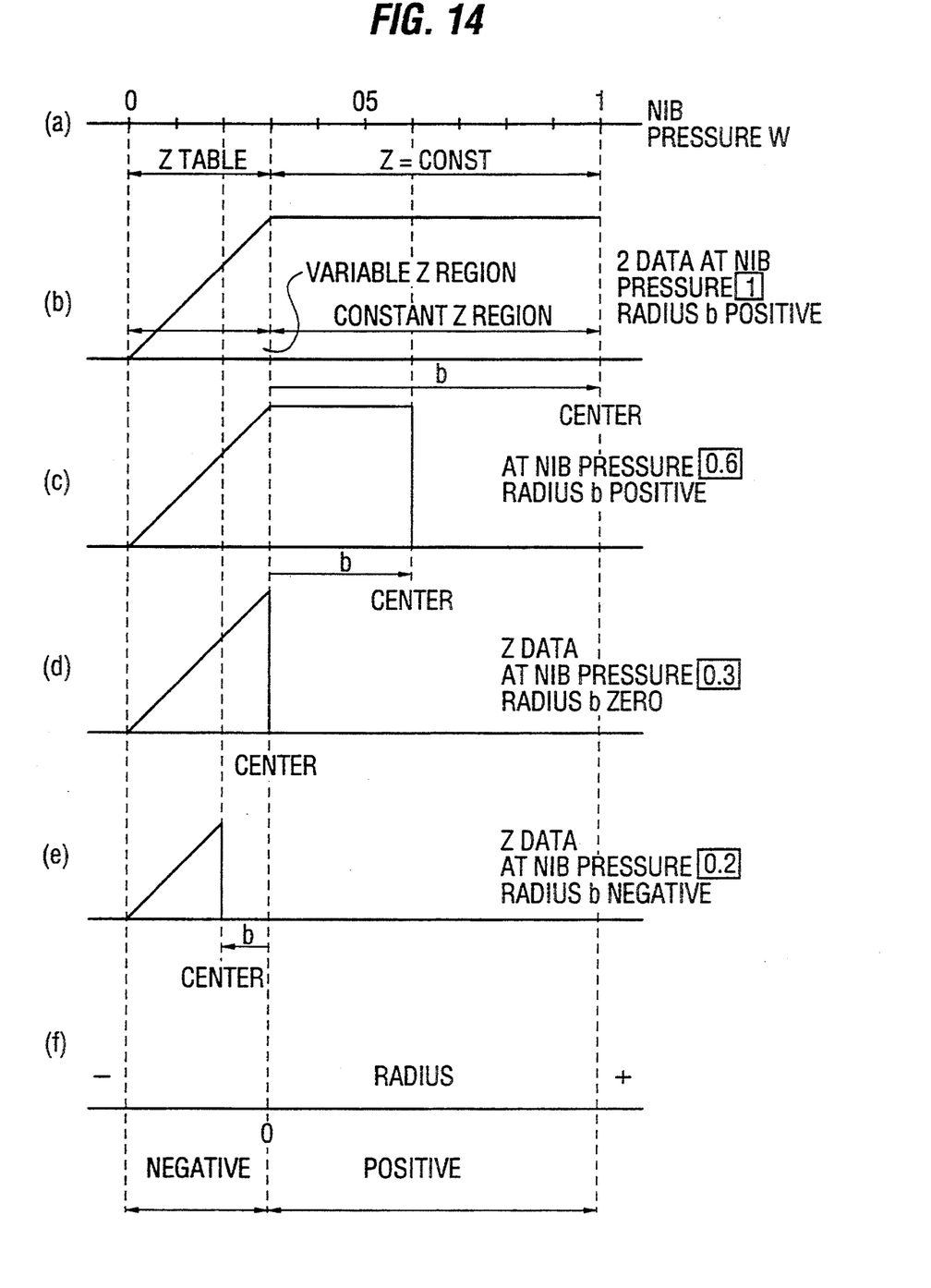
FIG. 14 (consisting of sub-parts (a)–(f)) is a diagram showing a relation between a radius b and a Z-value table.

FIG. 14(a) shows a range of the nib pressure W normalized from 0 to 1. FIG. 14(b) shows a Z distribution when W equals 1. FIG. 14(a) through 14(e) show a Z distribution corresponding to W values of 0.6, 0.3 and 0.2, respectively. In case the nib pressure W is less than 0.3, the radius "b" is assumed to be negative as shown in FIG. 14(f). Z values corresponding to the various W values are obtained from only one Z table.

The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An imaging apparatus comprising:
   an input device for generating display coordinates and nib pressure values of a stylus pen operated by a user;
   a display device;
   a frame memory for storing pixel illumination data for said display device;
   a painting data memory for storing colorizing data for the display device;
   a painting front-end processor, receiving said display coordinates and said nib pressure values from said input device, for calculating a display line of successive interpolated circle units each having a center coordinate and a radius in accordance with said display coordinates and said nib pressure value generated by said input device;
   a painting operation processor for generating addresses to said frame memory corresponding to pixel locations of said display device at display regions respectively corresponding to said circle units of said display line calculated by said painting front-end processor;
   a main processor for controlling said painting front-end processor and said painting operation processor in accordance with input commands applied thereto;
   a Z-operation processor for calculating, for each pixel location within each display region defined by said circle units, a first distance from said each pixel to the center coordinate of the corresponding circle unit, and for calculating a difference between said first distance and said radius of said corresponding circle unit, and for determining a value Z from said difference based on a predetermined relation between a value of said difference and said value Z, wherein said Z value is indicative of a relative illumination of the corresponding pixel location to effect soft-edge processing of an image; and,
   an anti-aliasing processor for receiving said pixel illumination data and colorizing data of a corresponding pixel location, for varying a relative illumination of said pixel illumination data and said colorizing data in accordance with said Z value of said corresponding pixel, and for combining the thus varied pixel illumination data and colorizing data and writing the resultant combined pixel data in said frame memory at an address of said corresponding pixel location.

2. An imaging apparatus as claimed in claim 1, wherein plural different sets of said predetermined relation between said value of said difference and said Z value are stored in advance, and wherein any one of said plural sets is selectable in response to an input command.

3. An imaging apparatus as claimed in claim 1, wherein an effective range of said value of said difference in which a corresponding Z value is obtained is variable.

4. An method of forming a video image comprising:
   generating display coordinates and nib pressure values of an input device in accordance with a display line formed by a stylus pen operated by a user;
   storing pixel illumination data of the display line for a display device in a frame memory;
   storing colorizing data of the display line for the display device in a painting memory;
   calculating, as the display line, successive interpolated circle units each having a center coordinate and a radius in accordance with said display coordinates and said nib pressure generated in said generating step;
   generating addresses to said frame memory corresponding to pixel locations of said display device at display regions respectively corresponding to said circle units of said display line calculated in said calculating step;
   calculating, for each pixel location within each display region defined by said circle units of said display line, a first distance from said each pixel to the center coordinate of the corresponding circle unit, and calculating a difference between said first distance and said radius of said corresponding circle, and determining a value Z from said difference based on a predetermined relation between a value of said difference and said value Z, wherein said Z value is indicative of a relative illumination of the corresponding pixel location to enable soft-edge processing of the video image; and, receiving said pixel illumination data and colorizing data of a corresponding pixel location, varying a relative illumination of said pixel illumination data and said colorizing data in accordance with said Z value of said corresponding pixel, and combining the thus varied pixel illumination data and colorizing data and writing the resultant combined pixel data in said frame memory at an address of said corresponding pixel location.

5. An imaging apparatus comprising:

painting means for generating display coordinates and a nib pressure value of a stylus pen operated by a user;

preprocessing means, receiving said display coordinates and said nib pressure value from said painting means, for calculating a circle painting unit having center coordinates and a radius respectively in accordance with said display coordinates and said nib pressure value generated by said painting means;

display means for displaying an image composed of plural pixels:

a frame memory, having plural memory elements having addresses corresponding to respective pixels of said display means, for storing pixel illumination data for said display means;

a painting operation processor for generating addresses to said frame memory corresponding to pixel locations of said display means at a display region corresponding to said circle painting unit calculated by said preprocessing means and for generating frame memory addresses denoting each pixel location within said display region;

Z-operation means for calculating, for each pixel location within said display region defined by said circle unit, a first distance from said each pixel to the center coordinate of the circle unit, and for calculating a difference between said first distance and said radius of said circle unit, and for determining a value Z from said difference based on a prestored table denoting a predetermined relation between a value of said difference and said value Z, wherein said Z value is indicative of a relative illumination of the corresponding pixel location to effect soft-edge processing of an image;

painting information generating means, responsive to said painting means, for generating colorizing information to be applied to an image displayed by said display means; and, an anti-aliasing processor for receiving said pixel illumination data and colorizing information of a corresponding pixel location, for varying a relative illumination of said pixel illumination data and said colorizing information in accordance with said Z value of said corresponding pixel, and for combining the thus varied pixel illumination data and colorizing information and writing the resultant combined pixel data in said frame memory at an address of said corresponding pixel location.

6. An imaging apparatus as claimed in claim 5, wherein said Z value is a constant value for each pixel located within said circle painting unit, and wherein said Z value decreases in value as said first distance increases outside said circle painting unit.

7. An imaging apparatus as claimed in claim 5 or 6, wherein said preprocessing means is further for calculating a display line of successive interpolated circle units each having a center coordinate and a radius in accordance with plural display coordinates and said nib pressure generated by said input device.

8. An imaging apparatus as claimed in claim 5 or 6, wherein said display region is a square region having sides encompassing said circle unit and having a center corresponding to said center coordinates of said circle unit.

9. An imaging apparatus as claimed in claim 7, wherein said display region is a square region having sides encompassing said circle unit and having a center corresponding to said center coordinates of said circle unit.

10. An imaging apparatus as recited in claim 1, wherein a coordinate system of said input device is finer than that of said display device.

11. An imaging apparatus as recited in claim 2, wherein a coordinate system of said input device is finer than that of said display device.

12. An imaging apparatus as recited in claim 3, wherein a coordinate system of said input device is finer than that of said display device.

13. An imaging apparatus as recited in claim 5, wherein a coordinate system of said painting means is finer than that of said display means.

14. An imaging apparatus as recited in claim 6, wherein a coordinate system of said painting means is finer than that of said display means.

15. An imaging apparatus as recited in claim 7, wherein a coordinate system of said painting means is finer than that of said display means.

16. An imaging apparatus as recited in claim 8, wherein a coordinate system of said painting means is finer than that of said display means.

17. An imaging apparatus as recited in claim 9, wherein a coordinate system of said painting means is finer than that of said display means.

18. An imaging apparatus comprising:

an input device for generating signals denoting position coordinates and nib pressure values of a stylus pen operated by a user;

a display device for displaying an image by a plurality of pixels;

a frame memory, having a plurality of memory elements designated by addresses corresponding to respective pixels, for storing pixel image data displayed by the display device;

a painting front-end processor, responsive to the signals from the input device, for calculating a center coordinate and a radius defining a circle painting unit in accordance with the position coordinates and a nib pressure value, and for generating signals denoting the center coordinate and values;

a Z-table having Z values each representing a contribution degree which decreases approximately in accordance with an increase in distance from a reference position;

a painting address processor, responsive to the signals from the painting front-end processor, for determining a pixel region which includes the defined circle painting unit on the display device, and for generating signals denoting addresses of the memory elements of the frame memory corresponding to each pixel location in the determined pixel region;

a Z-operation processor, responsive to the signals from the painting front-end processor and the painting address processor, for calculating a first distance from the coordinate of the pixel corresponding to the frame memory address to the center coordinate of the corresponding circle painting unit, and for reading a contribution degree Z based on the reference position out of the Z-table in a case where the first distance is smaller than the radius of the circle painting unit, for reading a contribution degree corresponding to a second distance calculated as a difference between the first distance and the radius in a case where the first distance is larger than or equal to the radius, and for generating signals denoting the thus read contribution degree Z; and, an anti-aliasing processor, responsive to the signals from the Z-operation processor and to the signals from the painting address processor, for executing a predetermined anti-aliasing process by applying the contribution degree Z for the image data read from the frame memory.

19. An image apparatus as claimed in claim 18, wherein the painting front-end processor interpolates data to the position coordinates and the nib pressure values of the stylus pen expressed by the signals from the input device when the stylus pen is moved by manipulation, and calculates center coordinates and radii defining circle painting units for this interpolated data, and generates signals denoting the center coordinates and the radii.

20. An imaging apparatus as claimed in claim 19, wherein the painting front-end processor, the Z-table, the Z-operation processor, and the anti-aliasing processor execute operation processes by using a coordinate system which is finer than the coordinate system used to locate pixels on the display device.

21. An imagining apparatus as claimed in claim 19, wherein the painting front-end processor interpolates the data with a pitch corresponding to 1/n of a radius of a circle painting unit, where n is greater than 1.

* * * * *